United States Patent
Roobol et al.

(10) Patent No.: US 6,363,058 B1
(45) Date of Patent: Mar. 26, 2002

(54) MULTI-SERVICE HANDLING BY A SINGLE MOBILE STATION

(75) Inventors: Christiaan Roobol, Hässelby; Johan Lundsjö, Bromma; Mathias Johansson, Sollentuna; Per Beming, Stockholm, all of (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/060,736

(22) Filed: Apr. 15, 1998

Related U.S. Application Data

(60) Provisional application No. 60/059,870, filed on Sep. 24, 1997.

(51) Int. Cl.[7] ................................................ H04B 7/00
(52) U.S. Cl. ........................ 370/310; 370/314; 370/537
(58) Field of Search .................................. 370/310, 209, 370/211, 329, 333, 336, 341, 347, 468, 469, 493, 498, 537, 539, 541, 252, 204, 205, 314, 335, 342, 441, 444, 455, 540, 345, 544

(56) References Cited

U.S. PATENT DOCUMENTS

| | | | | |
|---|---|---|---|---|
| 5,691,995 A | * | 11/1997 | Ikeda et al. .................. | 714/786 |
| 5,790,534 A | * | 8/1998 | Kokko et al. ................ | 172/462 |
| 5,949,790 A | * | 9/1999 | Pehkonen et al. ........... | 370/335 |
| 6,084,904 A | * | 7/2000 | Wang et al. .................. | 370/465 |
| 6,101,176 A | * | 8/2000 | Honkasalo et al. .......... | 370/130 |
| 6,111,912 A | * | 8/2000 | Cohen et al. ................ | 370/335 |
| 6,157,612 A | * | 12/2000 | Weerackody et al. ....... | 370/215 |

FOREIGN PATENT DOCUMENTS

| | | |
|---|---|---|
| EP | 0 634 840 A1 | 1/1995 |
| WO | WO 95/31878 | 11/1995 |

OTHER PUBLICATIONS

L. C. Yun, et al. Power Control for Variable QOS on a CDMA Channel—Proceedings of the Military Communications Conference (Milcom), Long Branch, N.J., Oct. 2–5, 1994; Institute of Electrical and Electronics Engineers, vol. 1, 2, Oct. 1994, X–00505880, pp. 178–182.

* cited by examiner

*Primary Examiner*—Douglas Olms
*Assistant Examiner*—Phirin Sam
(74) *Attorney, Agent, or Firm*—Jenkens & Gilchrist, P.C.

(57) ABSTRACT

A method for processing multiple data services over a communications link between a mobile station and a base station is disclosed. A RLC/MAC protocol layer of the communications link between a mobile station and a base station receives a plurality of radio bearer services each including at least one service provided by the mobile station. The plurality of radio bearer services are processed in such a manner that services having substantially similar quantity of signal requirements are combined for transmission on a single logical channel. Data within the transmission blocks may be prioritized to enable flexible control of transmission rates.

33 Claims, 3 Drawing Sheets

MULTI-SERVICE HANDLING BY A SINGLE MOBILE STATION

CROSS REFERENCE TO RELATED APPLICATIONS

The present application for patent is related to, and claims priority from, co-pending U.S. Provisional Application for Patent Ser. No. 60/059,870, filed Sep. 24, 1997, entitled "Multi-Service Handling Within One MS in a W-CDMA System" by Christiaan Roobol, Per Beming, Johan Lundsjo and Mathias Johansson. The disclosure of U.S. Provisional Application for Patent Ser. No. 60/059,870 is hereby incorporated by reference.

BACKGROUND OF THE INVENTION

1. Technical Field of the Invention

The present invention relates to mobile stations, and more particularly, to the ability of mobile stations to concurrently support multiple data transmission services.

2. Description of Related Art

The increasing technological developments within the area of wireless telecommunications have greatly increased the number of services which may be provided between a mobile station (MS) and a base station (BS). As the variety of services available from the mobile station continue to develop, mobile stations have acquired and are continuing to develop the ability to support several different types of services. These services include real time (RT) services, such as speech and video, and non real time (NRT) services, such as file transfers.

Problems arise in providing support for these varied services at the mobile station due to the different requirements of each service. For example, one service may require a bit error rate (BER) of $10^{-3}$ with low flexibility in the service delay requirements, while a second service may require a much higher bit error rate but have lower delay requirements. Ideally, each of these services are simultaneously supported by a single mobile station.

One solution to providing simultaneous services from a single mobile station involves creating a new physical channel for each service every time a new service becomes available to the mobile station. This may be undesirable from a mobile station complexity point of view.

Another solution involves multiplexing each of the services together onto the same channel and utilizing a single code on the channel. However, this solution is quite inefficient. In a situation where two services have greatly differing bit error rate requirements, the coding, interleaving and power control for the two services must be performed in such a way that the service requiring the strongest requirements is supported. Thus, when time multiplexing a first service onto the same channel with the second service having substantially higher requirements, a Quality of Service (QoS) in terms of the bit error rate for the first service is unduly high resulting in lost spectrum efficiency for the mobile station. On the other hand, if the coding, interleaving and power control are performed in accordance with the needs of the lower requirement service, the Quality of Service required for the higher requirement service will never be achieved, resulting in major service degradation.

Another problem with mobile stations providing multiple services involves the mapping of variable rate data services onto a single physical channel. For example, if the data rates of different services vary independently of each other, the transmissions from the mobile station could be coordinated in such a manner that the total transmission rate does not exceed a predetermined level.

Thus, a need has arisen for the development of a technique enabling the utilization of multiple services with varying system requirements from a single mobile station that provides optimal operating conditions for each of the multiple services and further provides the ability to control variable transmission rates,.

SUMMARY OF THE INVENTION

The present invention overcomes the foregoing and other problems with the method for processing multiple data services over a communications link between a mobile station and a base station. Initially, a RLC/MAC protocol layer of the communications link processes a plurality of radio bearer services. The data within the radio bearers is separated into a plurality of data blocks. The separated data blocks are combined with other data blocks from services having substantially similar Quality of Service requirements into a transmission block for transmission on a single logical channel. The number of data blocks per transmission block is variable. The generated transmission blocks are then transmitted over a single logical channel.

The data blocks within the transmission blocks may be prioritized such that high priority data blocks are transmitted prior to lower priority data blocks. This allows the transmission of certain types of data blocks at a higher transmission rate without actually altering the transmission rate of the single logical channel. Furthermore, the transmission of transmission blocks may be scheduled such that the output power and/or transmission rate of the transceiver generating the transmission blocks remains below a selected predetermined level.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
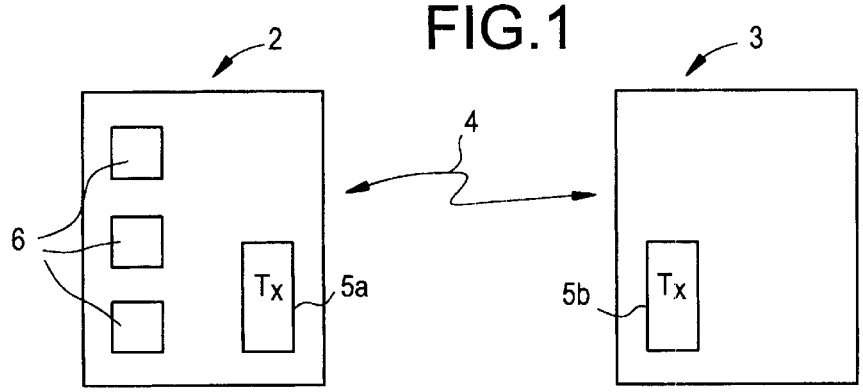
FIG. 1 is a block diagram of a mobile station, base station and associated communications link.

Referring now to the Drawings, and more particular to FIG. 1, there is illustrated a block diagram of a mobile station 2 and associated base station 3. The mobile station 2 and base station 3 communicate via a communications link 4 generated between a transceiver pair 5 in the mobile station 2 and base station 3. The mobile station 2 further includes a number of real time (RT) and non real time (NRT) services 6 which may be implemented from the mobile station 2 to the base station 3 over radio interface communications link 4. Real time services would include services such as speech and video transmissions while non real time services would include services such as data file transfers.

Figure 2:
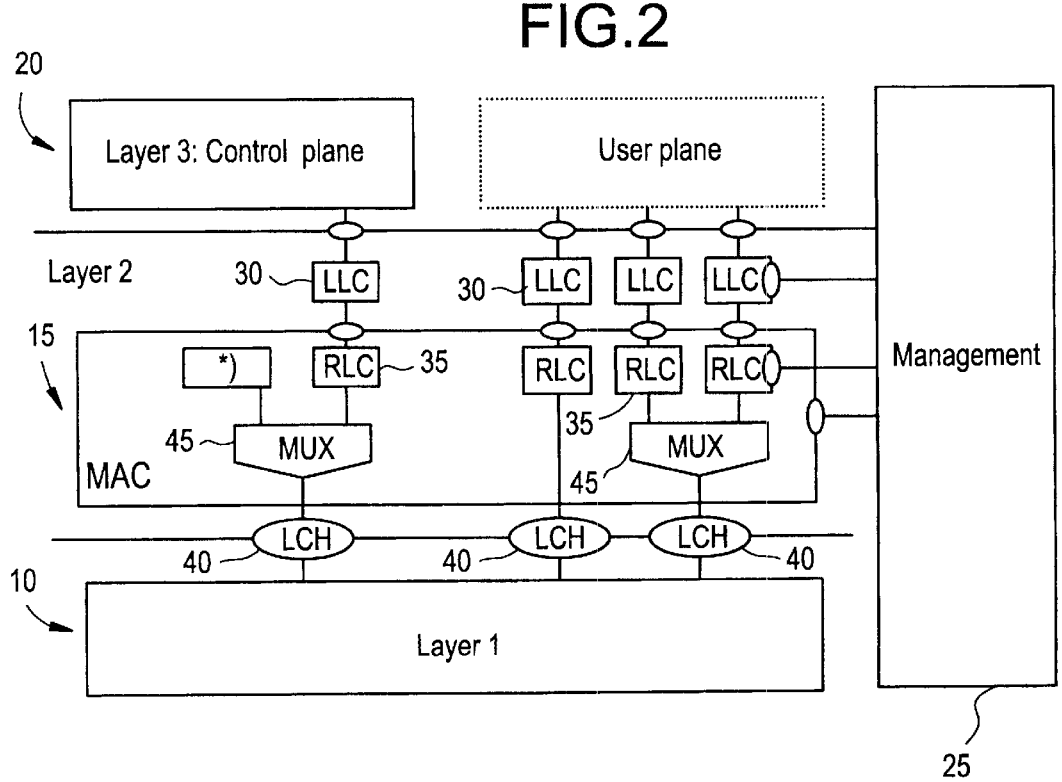
FIG. 2 is a block diagram illustrating the communications protocols associated with a mobile station communications link.

Referring now also to FIG. 2, there are illustrated the protocol layers enabling a communication link 4 between a mobile station transceiver 5a and a base station transceiver 5b. The protocol layers are designated layer 1 (physical layer 10), layer 2 (LLC RLC/MAC layer 15) and layer 3 20. Layer 1 (physical layer) 10 offers logical channels to layer 2. The physical layer 10 provides for communications between the mobile station 2 and a base station 3 of an associated network. The physical layer 10 controls functions necessary to maintain communications capability over the physical radio channel between a network and a mobile station 2. Layer 3 20 controls the radio bearers, which are realized by the services provided by layer 2.

Layer 2 provides the radio link control/medium access control (RLC/MAC) protocol and the logical link control layer (LLC) protocol 30. The RLC/MAC protocol generates the signaling needed for radio resource management and radio link control. The actual control of the RLC/MAC protocol is handled by a management plane 25. The management plane 25 contains all the algorithms and coordination functionalities necessary for controlling the RLC/MAC protocol and stretches over each of layers 1, 2, and 3.

The LLC protocol layer 30 output is processed by the radio link control protocol (RLC) 35 established by the management plane 25. LLC-PDUs (protocol data units) generated by the LLC layer 30 are further segmented by the RLC protocol 35 into RLC-PDUs in order to provide RLC-PDU sizes suitable for the radio interface. The RLC protocol 35 provides a stream of specifically classified data which is channel encoded and interleaved via a multiplexer 45 before being mapped onto a logical channel 40. A CRC code is added to an RLC-PDU prior to transmission to layer 1.

Upon creation, the RLC-PDUs are mapped by the management plane 25 onto the appropriate logical channels 40. The MAC protocol 33 of the RLC/MAC protocol layer 15 handles the mapping of RLC-PDUs from the RLC protocol 35 onto the physical layer 10. The MAC protocol 33 defines procedures enabling multiple mobile stations 2 to share a common transmission medium, which may consist of several physical channels. The MAC protocol 33 provides arbitration between multiple mobile stations 2 attempting to transmit simultaneously and provides collision avoidance, detection and recovery procedures. The options of the MAC protocol 33 allow a single mobile station 2 to use several physical channels in parallel.

Figure 3:
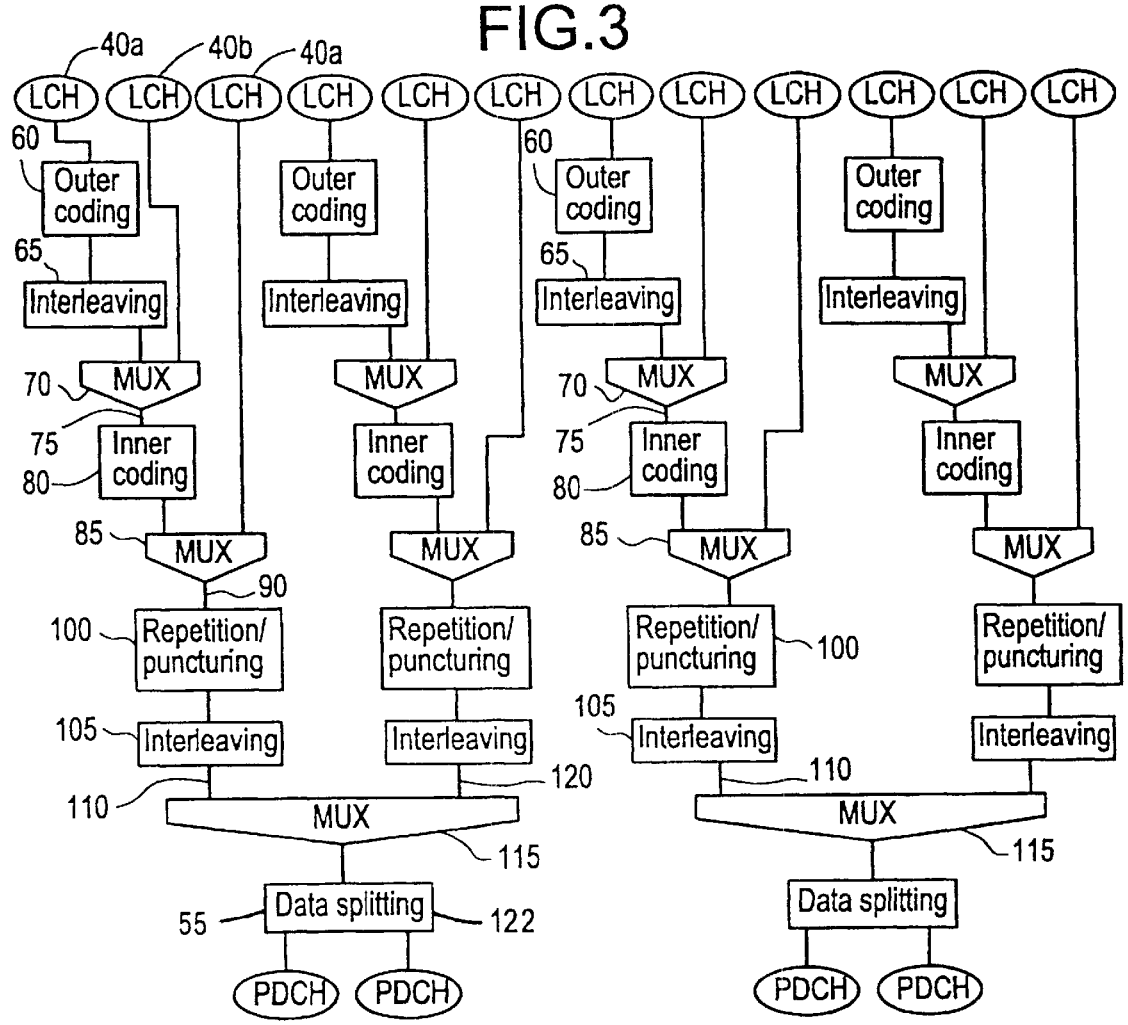
FIG. 3 is a block diagram of a physical layer.

Referring now also to FIG. 3, there is illustrated one embodiment of the physical layer 10 describing several ways of mapping logical channels 40 onto physical channels 55. A logical channel 40 represents a branch in the different chains of channel coding and interleaving depicted in FIG. 3. A logical channel 40a is outer encoded at 60 using any number of coding techniques, such as Reed-Solomon coding, and interleaved at 55. The encoded and interleaved signal is time-multiplexed at 70 with another logical channel 40b which has not been outer encoded or interleaved. The multiplexed data stream 75 is inner encoded using a convolutional encoding technique at 80 and multiplexed with an uncoded (or encoded at a higher level) logical channel 40c at 85. This multiplexed data stream 90 is processed using repetition or puncturing at 100 prior to a second interleaving at 105. Thereafter, the interleaved data stream is multiplexed at 115 with a similarly processed data stream 120. If the data stream provided by the multiplexing process at 115 has a higher data rate than a single physical channel 55 can manage, the data stream from the multiplexing process at 115 may be split into several physical channels 55 by a data splitting process 122.

This process may be extended to several parallel implementations, each mapping one or more logical channels 40 onto one or more physical channels 55. The particular configuration for mapping from logical channels 40 to physical channels 55 is generated at bearer setup between the mobile station 2 and the base station 3, and reconfiguration must be accomplished when a new bearer is setup or released. Typically, the configuration will be similar to that illustrated in FIG. 3. For example, the multiplexing of logical channels 40 wherein only a single channel is outer-encoded is generally not recommended since two differing services would benefit from being divided into different physical channels enabling individual outerloop power control.

The present invention provides flexibility in the manner in which radio bearers 20 are mapped onto logical channels 40 to enable the efficient management of various service mixes. From a mobile station 2 complexity point-of-view, different radio bearers should be multiplexed onto only a few spreading codes. On the other hand, if different radio bearers have different requirements, it is not desirable to map all of the radio bearers onto a single code. For example, if one bearer carries speech data and another carries video data, and both are mapped onto the same code, the power requirements necessary to transmit the signal would be unclear since the video data would have much higher bit error rate requirements than the speech data. If the power is adjusted to the requirements of the video service, the quality of the speech service would be far too high and waste bandwidth of the mobile station. Consequently, if the requirements were adjusted to the speech service, the bit error rate for the video service would be too high.

Figure 4:
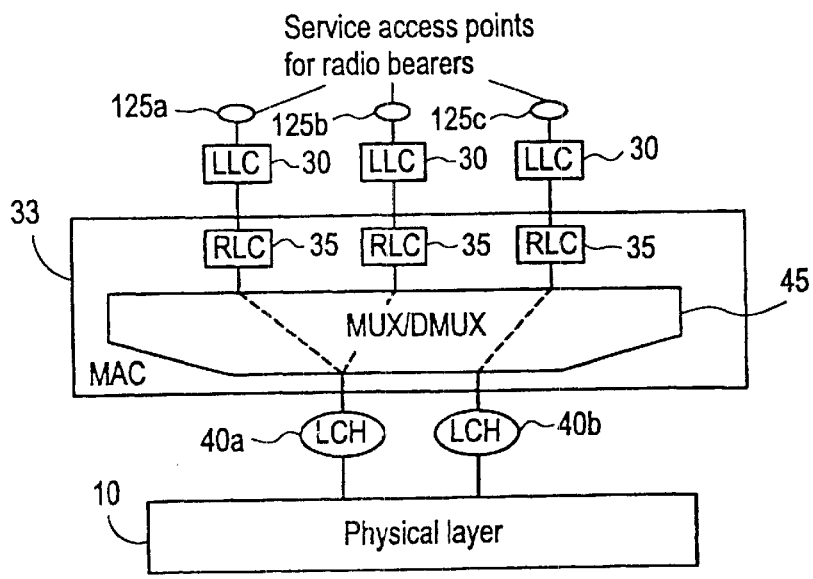
FIG. 4 illustrates the grouping of services according to the method of the present invention.

Referring now to FIG. 4, there is provided a simplified illustration of the interconnection between the RLC/MAC protocol layer 15 and the physical layer 10. Three service access points 125 provide radio bearers to the RLC/MAC layer 15. In this example, two of the radio bearers, namely those represented by 125a and 125b, have similar BER requirements. The logical link control 30 (LLC) output is processed by RLC protocol 35 as described previously with respect to FIG. 2. The MAC protocol 33 of the RLC/MAC protocol layer 15 controls the multiplexing of RLC-PDU blocks in such a fashion that the two radio bearers 125a and 125b with similar BER requirements are multiplexed by multiplexer 45 onto a single logical channel 40a. The radio bearer 125c is processed by the RLC/MAC layer 15 such that it is mapped onto a single logical channel 40b due to its differing requirements from the other services.

The resulting logical channels 40a and 40b are next processed by the physical layer 10 as described previously with respect to FIG. 3. The advantage of this system is that services having similar bit error rates and flexibility requirements are mapped into a single logical channel enabling the total number of logical channels to be reduced while still enabling separate coding and processing of the logical channels 40 having performance requirements that are dissimilar without corrupting services contained within the channel.

Figure 5:
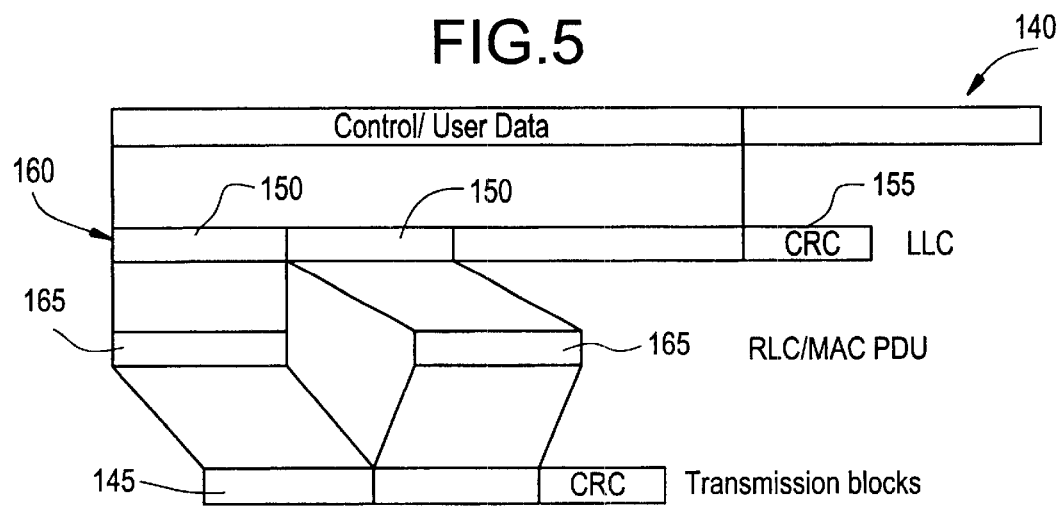
FIG. 5 illustrates the segmentation of LLC blocks into RLC/MAC PDUs which are transmitted by means of transmission blocks.

Referring now to FIG. 5, there is illustrated the manner in which control/user data 140 from a radio bearer 125 is converted into a transmission block 145 using the RLC/

MAC protocols of layer 2. Layer 3 control/user data 140 is segmented into blocks 150 and extended with CRC bits 155, to form a LLC PDU 160 at the LLC layer 30. The LLC PDUs 160 are segmented into smaller blocks, RLC/MAC PDUs 165 at the RLC layer 35. A variable number of RLC/MAC PDUs 165 are combined into a transmission block 145 by the MAC protocol 33.

The number of RLC/MAC PDUs and the number of bits within a transmission block 145 varies with time depending on the transmission rate and interleaving length. The variances in the transmission rate and interleaving length are referred to as the transmission format. The transmission block 145 may also be extended by CRC bits 170. In the illustration in FIG. 5, the transmission rate is such that only two segments 172 fit within a single transmission block 145. However, the next transmission block 145 may very well convey more than or less than two segments 172 depending on the transmission rate of the channel. In this way, variable rate transmissions may be accommodated. In an alternative embodiment, the CRC check bits 17 may also be placed within the RLC/MAC PDUs 165. This increases the processing overhead but improves performance for large data blocks.

As mentioned previously, the transmission format is the sequence of coding and interleaving in a particular manner together with a certain transmission rate on the physical channel. The transmission format could change, for example, due to variable bit rate services within a channel or risk overloading the system. When this happens, the number of bits per transmission block 145 will likely change as well, In the present figure, the transmission format is such that the transmission block 45 can convey two RLC/MAC PDUs at one time. In another instant of time, the transmission format may be changed such that the transmission block 45 can convey many more or less PDUs (the minimum value of the number of PDUs which the transmission block can convey is one). In this manner, variable bit rates are easily taken care of by altering the number of blocks within a transmission block, and thus, the transmission rate.

Figure 6:
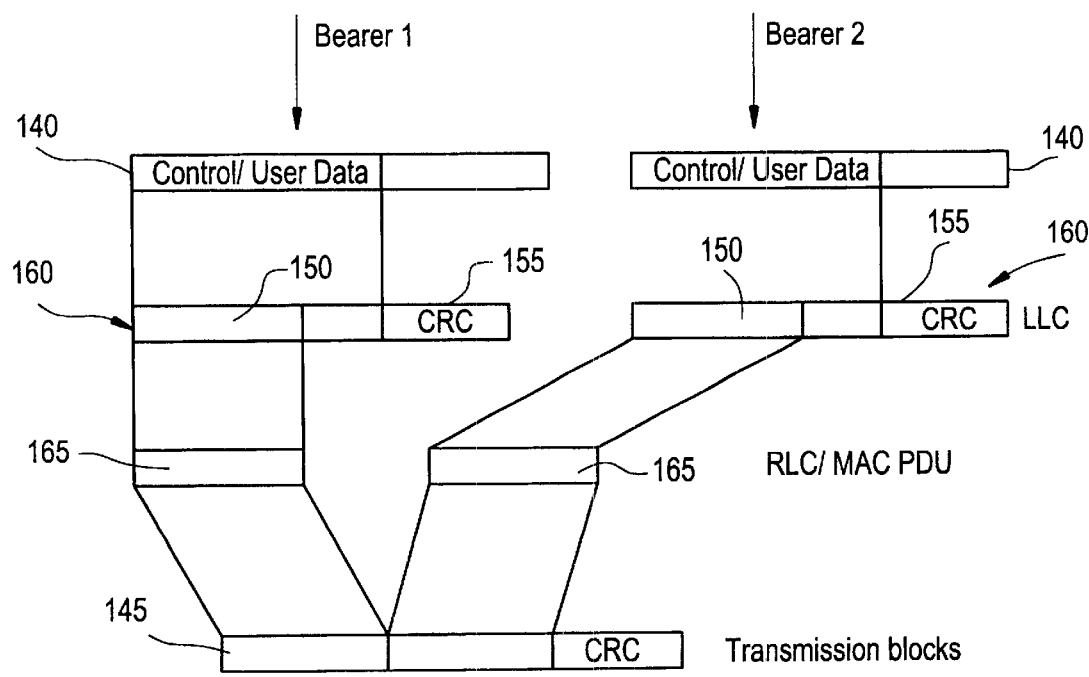
FIG. 6 illustrates the segmentation of LLC blocks from two separate radio bearers into transmission blocks.

Referring now to FIG. 6, there is illustrated the method by which the control/user data blocks 140 coming from a pair of radio bearer services are multiplexed together into a single transmission block 145. The control/user data blocks 140 are segmented into LLC PDUs 160 consisting of segmented data block portions 150 and a CRC bits 155 generated at the LLC stage 30. The LLC PDUs 160 are subdivided into smaller RLC/MAC PDUs 165 at the RLC level 35. The RLC/MAC PDUs 165 of different radio bearers having similar requirements are multiplexed into a single transmission block 145 for mapping onto a logical channel 40. Variable bit rates of the services included within the transmission block 145 are accounted for by altering the transmission format to change the number of segments in a transmission block at a particular time.

The variable bit rates may also be dealt with without altering the transmission format by prioritizing one variable bit rate service over another service within a shared transmission block 145. For example, the service stored in block 165a would be prioritized over the service stored in block 165b. This would cause the higher priority blocks to be transmitted first. In this manner, the variable transmission rate is taken care of without changing the actual transmission rate of the physical channel, thus maintaining a fixed bandwidth.

By grouping services having similar transmission requirements at the RLC/MAC level and prioritizing different bearers within the same group, variable transmission rates can be dealt with in a flexible manner. For example, a variable bit rate service and an available bit rate service having the same requirements with respect to bit error probability may be grouped together on the same logical channel. In this case, the variable bit rate service automatically determines which transmission format will be used. However, not all of the capacity is utilized by this service. Thus, the available bit rate service of the same mobile station is multiplexed onto the same physical channel.

Referring back now to FIG. 2, a mobile station providing a number of services in parallel will naturally attempt to transmit all transmission blocks simultaneously. However, this would cause the transmitter power to rise to unacceptable levels. Thus, in order to maintain the transmitting power at a level fixed by the base station 3, the management plane 25 of the RLC/MAC layer 15 can schedule the transmission of different transmission blocks 145 by prioritizing transmission blocks serving different groups of services such that the transmission power of the mobile station never exceeds a fixed threshold level. If the threshold level is ever changed, the RLC/MAC layer 15 can easily adapt to the new situation by scheduling the transmission of different groups of transmission blocks 145 in such a way that the new threshold level is met.

According to the teachings of the present invention by grouping the transmissions from various radio service bearers according to services having similar characteristics, prioritizing the services within a particular grouping and scheduling the transmission of the groupings at the RLC/MAC level within a mobile station such that set power levels are not exceeded, a flexible mechanism is provided to deal with the provision of multiple services by a single mobile station 2. The fact that the services may have variable BER requirements and output power requirements may be easily accommodated using this method.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A method for processing multiple data services over a communications link between a mobile station and a base station, comprising the steps of:

receiving a plurality of radio bearer services, each of the plurality of radio bearer services supporting at least one service;

separating data within the radio bearer services into a plurality of portions; and multiplexing portions from at least two of the plurality of radio bearer services having substantially similar Quality of Service requirements into transmission blocks of the single logical channel on the communications link, wherein a number of the portions per transmission block is variable.

2. The method of claim 1 further including the step of:

prioritizing the portions from different radio bearer services such that high priority portions are transmitted prior to lower priority the portions without altering a transmission rate of the single logical channel.

3. The method of claim 2, wherein the plurality of portions comprise radio link control/medium access control protocol data units.

4. The method of claim 2 further including the step of:

scheduling the transmission of transmission blocks such that an output power of a transceiver remains below a predetermined level.

5. The method of claim 4, wherein the predetermined level may vary in time.

6. The method of claim 2, wherein the prioritizing is done by the mobile station.

7. The method of claim 2, wherein the prioritizing is done by the base station.

8. The method of claim 1 further comprising the step of mapping the logical channels onto physical channels.

9. A method for processing multiple data services over a communications link between a mobile station and a base station, comprising the steps of:

receiving a plurality of radio bearer services, each of the plurality of radio bearer services supporting at least one service;

separating data within the radio bearer services into a plurality of data blocks;

multiplexing data blocks from at least two of the plurality of radio bearer services having substantially similar Quality of Service requirements into transmission blocks of a single logical channel on the communications link, wherein the number of data blocks per transmission block is variable;

prioritizing the data blocks from different radio bearer services such that high priority data blocks are transmitted prior to lower priority data blocks without altering a transmission rate of the single logical channel; and transmitting the transmission blocks on the single logical channel.

10. The method of claim 9 further including the step of:

scheduling the transmission rates of different logical channels such that an output rate of a transceiver remains below a predetermined level.

11. The method of claim 9 further including the step of:

scheduling the transmission of transmission blocks on the logical channel such that an output power of a transceiver remains below a predetermined level.

12. The method of claim 11, wherein the predetermined level may vary in time.

13. The method of claim 9, wherein the prioritizing is done by the mobile station.

14. The method of claim 9, wherein the prioritizing is done by the base station.

15. A method for processing multiple data services over a communications link between a mobile station and a base station, comprising the steps of:

receiving a plurality of radio bearer services, each of the plurality of radio bearer services supporting at least one service;

separating data within the radio bearer services into a plurality of data blocks;

combining the data blocks from radio bearer services having substantially similar Quality of Service requirements into transmission blocks of a single logical channel, wherein the number of data blocks per transmission blocks is variable;

scheduling the transmission of transmission blocks such that an output power of a transceiver remains below a predetermined level; and transmitting the transmission blocks on the single logical channel.

16. The method of claim 15, wherein the predetermined level may vary in time.

17. The method of claim 15 further including the step of:

prioritizing radio link control/medium access control protocol data units from different radio bearers such that high priority radio link control/medium access control protocol data units are transmitted prior to lower priority radio link control/medium access control protocol data units without altering a transmission rate.

18. The method of claim 17, wherein the prioritizing is done by the mobile station.

19. The method of claim 17, wherein the prioritizing is done by the base station.

20. A communications protocol for providing multiple data services over a communications link between a mobile station and a base station, comprising:

a first layer for mapping the logical channel onto a physical channel on the communications link;

a second layer for processing the radio bearers such that data services having substantially similar Quality of Service requirements are multiplexed into a same logical channel on the communications link; and a third layer for providing radio bearers containing a plurality of data services of the communications link.

21. The communications protocol of claim 20 further including a management layer for controlling functions of the second layer.

22. The communications protocol of claim 20, wherein the second layer further includes:

a logical link control layer for separating data from the radio bearers representing the services into a plurality of first units;

a radio link control layer for separating the plurality of first units into a plurality of smaller second units; and a medium access control layer for combining the plurality of smaller second units from data services having similar Quality of Service requirements into a single logical channel.

23. The communications protocol of claim 22, wherein the medium access control layer further includes a multiplexer for combining the plurality of smaller second units.

24. The communications protocol of claim 22, wherein the medium access control layer further comprises means for prioritizing the plurality of smaller second units such that higher priority second units are transmitted prior to lower priority second units without altering a transmission rate of a logical channel.

25. The communications protocol of claim 24, wherein the means for prioritizing is controlled by the mobile station.

26. The communications protocol of claim 24, wherein the means for prioritizing is controlled by the base station.

27. The communications protocol of claim 22, wherein the management layer includes all algorithms and coordination functionalities for controlling the first, second and third layers.

28. The communications protocol of claim 22, wherein the prioritizing is done by the mobile station.

29. The communications protocol of claim 22, wherein the prioritizing is done by the base station.

30. The communications protocol of claim 20, wherein the second layer further schedules the transmission of transmission blocks of data on the physical channels such that an output power of a transceiver remains below a predetermined level.

31. The communications protocol of claim 30, wherein the predetermined level may vary in time.

32. A method for processing multiple data services over a communications link between a mobile station and a base station, comprising the steps of:

receiving a plurality of radio bearer services, each of the plurality of radio bearer services supporting at least one service;

separating data within the radio bearer services into a plurality of portions;

multiplexing portions from at least two of the plurality of radio bearer services having substantially similar Quality of Service requirements into transmission blocks of the single logical channel on the communications link, wherein a number of the portions per transmission block is variable; and prioritizing the portions from different radio bearer services such that high priority portions are transmitted prior to lower priority the portions without altering a transmission rate of the single logical channel.

33. A communications protocol for providing multiple data services over a communications link between a mobile station and a base station, comprising:

a first layer for mapping the logical channel onto a physical channel on the communications link;

a second layer for processing the radio bearers such that data services having substantially similar Quality of Service requirements are multiplexed into a same logical channel on the communications link;

wherein the second layer further includes:

a logical link control layer for separating data from the radio bearers representing the services into a plurality of first units;

a radio link control layer for separating the plurality of first units into a plurality of smaller second units; and a medium access control layer for combining the plurality of smaller second units from data services having similar Quality of Service requirements into a single logical channel;

a third layer for providing radio bearers containing a plurality of data services of the communications link.

* * * * *